United States Patent

Ohletz et al.

(10) Patent No.: US 8,616,569 B2
(45) Date of Patent: Dec. 31, 2013

(54) ARRANGEMENT OF A STABILIZER ON A WHEEL SUSPENSION FOR MOTOR VEHICLES

(75) Inventors: Armin Ohletz, Kösching (DE); Walter Schmidt, Rennertshofen (DE)

(73) Assignee: Audi AG, Ingolstadt (DE)

( * ) Notice: Subject to any disclaimer, the term of this patent is extended or adjusted under 35 U.S.C. 154(b) by 64 days.

(21) Appl. No.: 13/145,853

(22) PCT Filed: Dec. 23, 2009

(86) PCT No.: PCT/EP2009/009236
§ 371 (c)(1),
(2), (4) Date: Jul. 22, 2011

(87) PCT Pub. No.: WO2010/083875
PCT Pub. Date: Jul. 29, 2010

(65) Prior Publication Data
US 2011/0278812 A1 Nov. 17, 2011

(30) Foreign Application Priority Data
Jan. 23, 2009 (DE) .......................... 10 2009 005 899

(51) Int. Cl.
*B60G 21/055* (2006.01)
(52) U.S. Cl.
USPC ..................... 280/124.13; 280/5.511; 267/188
(58) Field of Classification Search
CPC ........................ B60G 21/055; B60G 21/0555
USPC ............. 280/5.502, 5.511, 124.106, 124.107, 280/124.13, 124.149; 267/188
See application file for complete search history.

(56) References Cited

U.S. PATENT DOCUMENTS

| 6,361,033 B1 * | 3/2002 | Jones et al. ................... 267/187 |
| 6,425,585 B1 * | 7/2002 | Schuelke et al. ........... 280/5.511 |
| 7,104,560 B2 * | 9/2006 | Momiyama ............ 280/124.107 |
| 7,270,336 B2 * | 9/2007 | Fujimori .................... 280/5.511 |

(Continued)

FOREIGN PATENT DOCUMENTS

| DE | 101 26 928 A1 | 12/2002 |
| DE | 101 48 095 A1 | 4/2003 |
| DE | 102 42 552 | 3/2004 |

(Continued)

*Primary Examiner* — Paul N Dickson
*Assistant Examiner* — Timothy Wilhelm
(74) *Attorney, Agent, or Firm* — Henry M Feiereisen LLC

(57) ABSTRACT

The invention relates to an arrangement of a stabilizer (44), which is configured in two parts, on a wheel suspension for a motor vehicle, characterized in that the stabilizer parts (43) thereof can be rotated relative to one another in the same or opposite direction by means of an associated motor/gear unit (46). Each stabilizer part (43) comprises a hollow-cylindrical outer torsion bar (49) whose end on the gear side (45) is connected to a gear output (50a) and whose end distal from the gear is connected for drive purposes to an inner torsion bar (47) which is guided through the hollow-cylindrical outer torsion bar (49) and out of the end (45) on the gear side of the hollow-cylindrical outer torsion bar. The inner torsion bar (47) is directly or indirectly connected to an output lever (41) which is articulated on a wheel suspension element (16). According to the invention, the gear (50) of the motor/gear unit is disposed with its gear output (50a) between the actuator motor (48) and the output lever (41) in the transverse direction of the vehicle (y).

10 Claims, 2 Drawing Sheets

(56) References Cited

U.S. PATENT DOCUMENTS

| | | | |
|---|---|---|---|
| 7,500,686 B2 * | 3/2009 | Munster | 280/124.107 |
| 7,543,823 B2 * | 6/2009 | Buma et al. | 280/5.502 |
| 7,726,666 B2 * | 6/2010 | Grannemann et al. | 280/5.511 |
| 7,766,344 B2 * | 8/2010 | Buma | 280/5.511 |
| 7,931,281 B2 * | 4/2011 | Maeda et al. | 280/5.511 |
| 2005/0167932 A1 | 8/2005 | Munster | |
| 2006/0049601 A1 * | 3/2006 | Matsumoto | 280/124.106 |
| 2007/0182110 A1 * | 8/2007 | Urababa | 280/5.508 |
| 2009/0008887 A1 * | 1/2009 | Buma | 280/5.511 |
| 2010/0072725 A1 * | 3/2010 | Woellhaf et al. | 280/124.107 |

FOREIGN PATENT DOCUMENTS

| | | |
|---|---|---|
| DE | 10 2004 002 550 | 8/2005 |
| DE | 10 2004 004 335 | 8/2005 |
| DE | 10 2007 007 214 | 8/2008 |
| EP | 1 634 732 A1 | 3/2006 |
| EP | 1 958 804 A1 | 8/2008 |
| JP | 2006 082751 | 3/2006 |
| JP | 2008 302731 | 12/2008 |

* cited by examiner

US 8,616,569 B2

ARRANGEMENT OF A STABILIZER ON A WHEEL SUSPENSION FOR MOTOR VEHICLES

CROSS-REFERENCES TO RELATED APPLICATIONS

This application is the U.S. National Stage of International Application No. PCT/EP2009/009236, filed Dec. 23, 2009, which designated the United States and has been published as International Publication No. WO 2010/083875 and which claims the priority of German Patent Application, Serial No. 10 2009 005 899.0, filed Jan. 23, 2009, pursuant to 35 U.S.C. 119(a)-(d).

BACKGROUND OF THE INVENTION

The invention relates to an arrangement of a stabilizer on a wheel suspension for motor vehicles.

For example, DE 101 26 928 A1, DE 10 2004 002 550 A1 or DE 102 42 552 B4 disclose arrangements of two-part stabilizers with an actuating device for affecting the spring rates and the driving characteristics of motor vehicles. The roll behavior and banking of the motor vehicle can be reduced by adjusting the split torsion bars of the overall U-shaped stabilizer in opposite directions, or the tendency to slant, for example during braking, can be compensated through adjustment in the same direction.

DE 10 2007 007 214 A1 discloses a generic arrangement of such two-part stabilizer. The parts of this stabilizer can be controlled and rotated relative to each other with a motor/gear unit. Each of the stabilizer parts has an outer hollow bar with a gear-side end that is connected with the gear output of the motor/gear unit. The end of the hollow bar distal from the gear is drivingly connected with an inner solid bar which passes through the hollow bar and exits from its gear-side end. The inner solid bar supports indirectly or directly a driven lever which is connected to a wheel suspension element.

The stabilizer parts are subjected to severe torsion stresses during an active adjustment of the roll, slant or self-steering behavior. Such torsion stresses can be reduced by increasing the diameter of the respective stabilizer part. The effective spring length of the stabilizer part corresponds to the length of a load path extending from the gear output of the motor/gear unit via the hollow bar and the solid bar passing therethrough to the driven lever and transmits an actuation moment on to the wheel suspension element.

SUMMARY OF THE INVENTION

It is the object of the invention to provide an arrangement of a two-part stabilizer on a wheel suspension of a motor vehicle, with which the torsional stresses in the stabilizer parts generated during the operation are reduced.

The object is attained according to an aspect of the invention by a two-part stabilizer which is arranged on a wheel suspension of a motor vehicle and includes stabilizer parts which can be rotated with respect to one another with an associated motor/gear unit in a same or in an opposite direction, wherein each stabilizer part includes a hollow-cylindrical outer torsion bar having a gear-side end connected with a gear output and having a gear-distal end which is drivingly connected with an inner torsion bar, which extends through the hollow-cylindrical outer torsion bar and is guided out of its gear-side end, with the inner torsion bar connected directly or indirectly with a driven lever which is attached to a wheel suspension element, wherein the gear of the motor/gear unit is arranged with its gear output in the transverse direction of the vehicle between the actuator motor and the driven lever.

According to the present invention, the axial arrangement of the motor/gear unit and of the driven lever for each of the stabilizer parts is selected such that the gear with its gear output is arranged in the transverse direction of the vehicle between the actuator motor and the driven lever. In this way, the gear with its gear output is moved closer to its driven lever in the axial direction of the stabilizer part, as compared to an axial arrangement wherein the gear with the associated gear output is arranged on the side of the actuator motor that faces away from the driven lever. According to the invention, the length of the hollow-cylindrical outer torsion rod connected with the gear output can then be extended without increasing the overall length of the stabilizer part in the transverse direction of the vehicle. Such a length increase of the stabilizer parts in the transverse direction of the vehicle would lead to problems with the installation space.

The ends of the stabilizer parts facing each other in the center of the vehicle would have to be interlaced in this situation which is quite complex.

The motor/gear unit can be arranged coaxially with the torsion axis of the stabilizer part. The respective stabilizer part can then be guided through the center of the gear/actuator motor unit.

The hollow-cylindrical outer torsion bar connected with the gear output, i.e., the hollow bar, operates in the stabilizer part as a first torsion spring which is connected in series with the returned inner torsion bar operating as a second torsion spring of the stabilizer part. To attain an additional intentional yieldability of the stabilizer part, the end of the inner torsion bar exiting the hollow bar can be drivingly connected with an additional hollow-cylindrical outer torsion bar operating as a third torsion spring. This additional outer torsion bar may support the driven lever in form of a sleeve and be returned towards the gear. This produces an interlaced arrangement having two hollow rods with an inner solid bar guided in the hollow rods.

The respective stabilizer part can be supported for rotation in the region of the transition to the driven lever on a bearing disposed on the car body or on the gear/actuator motor unit. The bending moments which are applied by the wheel guiding elements on the stabilizer parts during an adjustment operation can then be largely absorbed by the bearing, whereas only torsion moments are applied to the motor/gear unit.

It is advantageous for the installation space if the bearing is formed directly in a housing of the actuator motor/gear unit. In this way, the gear output and hence the gear-side end of the hollow-cylindrical outer torsion bar can be moved even closer to the driven lever.

To further increase the effective spring length, the stabilizer part can be extended beyond the driven lever in the transverse direction of the vehicle towards the vehicle wheel with a projecting length. The stabilizer part can then be moved into direct proximity of the vehicle wheel, wherein in this case only a required unobstructed space of the vehicle wheel must be taken into consideration when dimensioning the projecting length.

To further increase the yieldability of the stabilizer part, in addition and/or alternatively to the aforementioned embodiments, the driven lever can be implemented not as a rigid element, but as a spring element with predetermined spring hardness. The driven element can preferably be inserted between the stabilizer part and the wheel suspension element in form of a leaf spring.

BRIEF DESCRIPTION OF THE DRAWING

An exemplary embodiment of the invention will now be described in more detail. It is shown in.

DETAILED DESCRIPTION OF PREFERRED EMBODIMENTS

Figure 1:
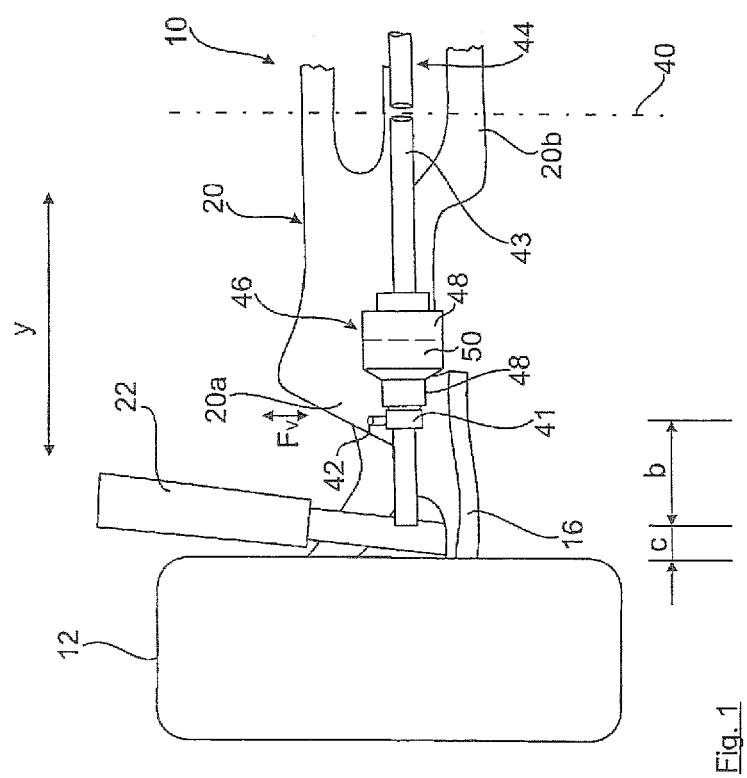
FIG. 1 a rear view of a rear wheel suspension with a two-part split stabilizer and two electromechanical actuating devices, wherein the torsion bars of the stabilizer are structurally subdivided in a solid bar.

FIG. 1 shows in a schematic diagram a rear wheel suspension 10 for the rear wheels 12 of a motor vehicle, which includes wheel-guiding suspension arms, with only a lower suspension arm 16 being shown in FIG. 1 as an example. The trapezoidal suspension arm 16 is pivotally supported on a wheel carrier (not visible) and on an auxiliary frame 20 on the car body. The auxiliary frame 20 has two lateral longitudinal rails 20a and two crossbeams 20b and is attached, in a manner not shown, to the car body of the motor vehicle by way of damping bearings. The arrangement illustrated in FIG. 1 is only depicted somewhat beyond the center plane 40.

In addition, a shock absorber 22 and an unillustrated support spring are arranged between the lower trapezoidal suspension arm 16 and the car body of the motor vehicle in a conventional manner. The wheel suspension 10 can in modified form also be used as a wheel suspension for the front steered wheels of a motor vehicle.

Furthermore, a substantially U-shaped two-part stabilizer 44 is supported on the wheel suspension 10 for rotation via bearings 53, wherein the driven lever 41 of the stabilizer 44 which extends substantially in the longitudinal direction of the vehicle is attached to the lower suspension arm 16 of the wheel suspension 10. During operation, the driven lever 41 can transmit an adjusting force $F_V$ to the lower suspension arm 16 via the attachment point 42.

Only the left-side stabilizer parts 43 of the stabilizer 44 are shown in both figures. The right-side stabilizer parts can be constructed identically.

The effect of the two-part stabilizer 44 on the suspension arms 16 can be adjusted by two electromechanical actuating devices 46, each composed of an electric motor 48 and a, for example, self-inhibiting reduction gear 50.

The reduction gear 50 and the electric motor 48 are hereby each coaxially aligned with the substantially transverse stabilizer parts 43 of the stabilizer 44.

The transverse stabilizer parts 43 of the stabilizer 44, which is split approximately in the vertical longitudinal center plane 40 of the vehicle, are adjusted via the motor-operating units 46.

Figure 2:
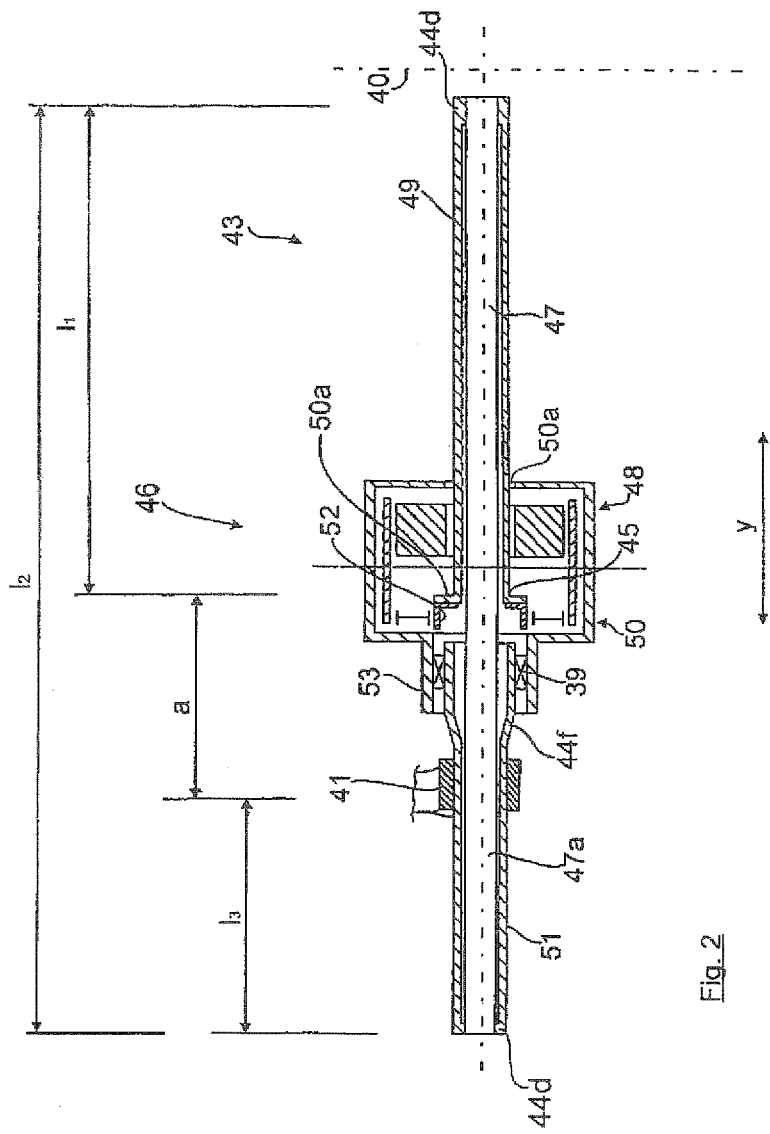
FIG. 2 a center longitudinal cross-section through a torsion bar of the stabilizer arrangement according to FIG. 1 with a coaxially aligned actuating device.

Each of the stabilizer parts 43 of the stabilizer 44 is constructed in detail according to FIG. 2 (unillustrated arrangement is mirror symmetric):

The stabilizer part 43 is constructed of a solid bar 47 and a radially outer, tubular hollow bar 49. The two rods 47, 49 are made of spring steel and can therefore be twisted. The hollow bar 49 may optionally have an open cross-sectional profile.

The gear-side end 45 of the hollow bar 49 is drivingly connected by, for example, a flange connection 50a with the output of the reduction gear 50, for example a ring gear 52, and extends from the output through the electric motor 41 to approximately the vehicle center 40. The effective spring length of the hollow bar 49 is indicated in FIG. 2 with $l_1$. The end of the hollow bar 49 distal from the gear is in fixed rotative engagement with the solid bar by way of a spline 44d.

The solid bar 47 now extends in the opposite sense via a second effective spring length $l_2$ towards the outside of the vehicle through the hollow bar 49, through the coaxially aligned electric motor 48 and through the reduction gear 50—a so-called harmonic drive gear.

The solid bar 47 further extends with a section 47a freely beyond the attachment location of the driven lever 41 and terminates with an additional spline 44d, by which the solid bar 47 is in turn drivingly connected with a return hollow shaft 51. The return hollow shaft 51 extends over a third effective spring length $l_3$. This results in an overall load path extending from the gear output 50a to the driven lever 41 via the effective spring lengths $l_1, l_2, l_3$ of the hollow shafts 49, 51 and the solid bar 47.

As can be seen, the hollow shaft 51 supports the driven lever 41 and is adjacently supported for rotation directly in a housing section 48a of the gear 50 by a formed bearing neck 44f and via a needle bearing 49.

As illustrated in FIGS. 1 and 2, the stabilizer 44 and its stabilizer parts 43 and the motor/gear unit 46 are constructed coaxially with a straight alignment.

As further illustrated in both FIG. 1 and FIG. 2, the axial arrangement consisting of the driven lever 41 and the motor/gear unit 46 is configured such that the gear 50 with its gear output 50a is arranged in the transverse direction y of the vehicle between the actuator motor 48 and the driven lever 41. In this way, the gear-side end 45 of the hollow bar 49 is moved as close as possible to the driven lever 41. The axial spacing a between the driven lever 41 and the gear-side end 45 of the hollow bar 49 is therefore reduced to a minimum installation length, with installation space remaining only for the bearing 53. The effective spring length $l_1$ of the hollow bar 49 is then extended commensurately, thereby increasing the yieldability of the stabilizer part 43 and reducing its torsion stress.

As further illustrated in FIG. 1, the stabilizer part 43 projects in the transverse direction y of the vehicle with a projecting length b beyond the bearing of the driven lever. The projecting length b of the stabilizer 43 is dimensioned such that the entire installation space between the driven lever 41 and the vehicle wheel 12 minus a required clearance c is utilized, which is required for adjustment of the toe angle/camber angle of the vehicle wheel 12. The effective spring length $l_2$ of the solid bar 47 and the effective spring length $l_3$ of the returned hollow shaft 51 are therefore also substantially elongated. The softness of the stabilizer part 43 can be additionally increased by implementing the driven lever 41 as an additional spring element.

The invention claimed is:

1. A two-part stabilizer for arrangement on a wheel suspension for a motor vehicle, said stabilizer comprising:
    motor/gear units, each having a gear with a gear output and an actuator motor,
    a driven lever articulated on a wheel suspension element, and
    stabilizer parts operably connected to the motor/gears units in one-to-one correspondence so as to be rotatable with respect to one another by the motor/gear units in a same direction or in opposite directions, each stabilizer part comprising an inner torsion rod which is directly or indirectly connected with the driven lever, and a hollow-cylindrical outer torsion rod, said outer torsion rod having a gear-proximal end which is connected with the gear output, and a gear-distal end drivingly connected with the inner torsion rod, said inner torsion rod extending through the hollow-cylindrical outer torsion rod and exiting the gear-proximal end, wherein the gear with the gear output is arranged between the actuator motor and the driven lever in a transverse direction of the vehicle.

2. The stabilizer of claim 1, wherein the actuator motor and the gear are arranged coaxially with respect to a torsion axis of the stabilizer part.

3. The stabilizer of claim 1, wherein the stabilizer part is guided through the gear and the actuator motor.

4. The stabilizer of claim 1, further comprising a further hollow-cylindrical outer torsion rod which is returned toward the gear and supports the driven lever, wherein an end of the inner torsion rod exiting the hollow-cylindrical outer torsion rod is drivingly connected with the further hollow-cylindrical outer torsion rod.

5. The stabilizer of claim 4, wherein the stabilizer part is extended by a projecting length beyond the driven lever towards a vehicle wheel in the transverse direction of the motor vehicle.

6. The stabilizer of claim 5, wherein the projecting length corresponds to a distance between the driven lever and the vehicle wheel in a neutral position of the vehicle wheel minus a required clearance for the vehicle wheel.

7. The stabilizer of claim 1, further comprising a bearing for rotatably supporting the stabilizer part in a transition region to the driven lever.

8. The stabilizer of claim 7, wherein the bearing is formed directly in a housing of the motor/gear unit.

9. The stabilizer of claim 1, wherein the driven lever is constructed as a spring element.

10. The stabilizer of claim 9, wherein the spring element is configured as a leaf spring.

* * * * *